(12) United States Patent
Chen

(10) Patent No.: US 8,197,178 B1
(45) Date of Patent: Jun. 12, 2012

(54) WIND CONE WINDMILLS AND APPLICATION TO ENERGY HARVESTING FACTORY SHIPS

(76) Inventor: Franklin Y. K. Chen, Northport, NY (US)

( * ) Notice: Subject to any disclaimer, the term of this patent is extended or adjusted under 35 U.S.C. 154(b) by 601 days.

(21) Appl. No.: 12/360,766

(22) Filed: Jan. 27, 2009

(51) Int. Cl.
*F03D 7/00* (2006.01)

(52) U.S. Cl. ............................. 415/4.1; 440/8; 290/55

(58) Field of Classification Search .......... 290/44, 290/55; 415/2.1, 4.1–4.4; 440/8
See application file for complete search history.

(56) References Cited

U.S. PATENT DOCUMENTS

| | | | |
|---|---|---|---|
| 299,127 A * | 5/1884 | Garrigus | 415/2.1 |
| 757,800 A | 4/1904 | Williams | |
| 1,025,428 A | 5/1912 | Stanschus | |
| 1,181,988 A * | 5/1916 | Breitung | 440/8 |
| 1,345,022 A | 6/1920 | Oliver | |
| 3,883,750 A | 5/1975 | Uzzell, Jr. | |
| 3,986,786 A | 10/1976 | Sellman | |
| 4,127,356 A * | 11/1978 | Murphy | 415/4.1 |
| 5,457,346 A | 10/1995 | Blumberg et al. | |
| 5,977,649 A | 11/1999 | Dahill | |
| 6,981,839 B2 | 1/2006 | Fan | |
| 7,176,584 B1 | 2/2007 | Green | |
| 7,245,039 B2 | 7/2007 | DuHamel | |
| 7,368,828 B1 | 5/2008 | Calhoon | |

FOREIGN PATENT DOCUMENTS

| | | |
|---|---|---|
| DE | 19626360 | 1/1998 |
| DE | 19645415 | 5/1998 |
| EP | 0509127 | 10/1992 |
| GB | 2.444.557 | 8/2006 |

* cited by examiner

*Primary Examiner* — Ross Gushi
(74) *Attorney, Agent, or Firm* — Michael I. Kroll

(57) ABSTRACT

Large wind cones are used to collect and discharge wind energy to small low cost wind turbines. Large straight or gradually bending windcones are installed as sails on top of ships, on anchored floating platforms and on anchored land platforms. Special ship design features to harvest and store harvested wind energy at sea as described.

Also presented is a simple low cost design of a small self-azimuth-adjusting wind cone windmill, where the electric generator is located closed to the ground for easy installation and service.

32 Claims, 13 Drawing Sheets

WIND CONE WINDMILLS AND APPLICATION TO ENERGY HARVESTING FACTORY SHIPS

BACKGROUND OF THE INVENTION

1. Field of the Invention

The present invention relates generally to wind turbines and, more specifically, to a wind cone windmill on ship roaming the oceans to transform fluid kinetic energy into electricity that can be used to extract potable water from sea water and also used to separate oxygen and hydrogen from water and stored on board a ship for global distribution in addition to supply fuel cells to power the ship. Applications are scalable for land, land based vehicles, homes, factories and water crafts.

2. Description of the Prior Art

There are other wind device designed for energy conversion. Typical of these is U.S. Pat. No. 757,800 issued to Williams on Apr. 19, 1904.

Another patent was issued to Stanschus on May 7, 1912 as U.S. Pat. No. 1,025,428. Yet another U.S. Pat. No. 1,345,022 was issued to Oliver on Jun. 29, 1920 and still yet another was issued on May 13, 1975 to Uzzell, Jr. as U.S. Pat. No. 3,883,750.

Another patent was issued to Sellman on Oct. 19, 1976 as U.S. Pat. No. 3,986,786. Yet another U.S. Pat. No. 4,127,356 was issued to Murphy on Nov. 28, 1978. Another was issued to Blumberg et al. on Oct. 10, 1995 as U.S. Pat. No. 5,457,346 and still yet another was issued on Nov. 2, 1999 to Dahill as U.S. Pat. No. 5,977,649.

Another patent was issued to Fan on Jan. 3, 2006 as U.S. Pat. No. 6,981,839. Yet another U.S. Pat. No. 7,176,584 was issued to Green on Feb. 13, 2007. Another was issued to DuHamel on Jul. 17, 2007 as U.S. Pat. No. 7,245,039 and still yet another was issued on May 6, 2008 to Calhoon as U.S. Pat. No. 7,368,828.

Another patent was issued to Hector, Sr. on Oct. 21, 1992 as European Patent Application No. EP0509127. Yet another German Patent No. DE19626380 was issued to Popescu on Jan. 8, 1998. Another was issued to Kramer on May 7, 1998 as German Patent No. DE19645415 and still yet another was issued on Dec. 8, 2006 to Birmingham as U.K. Patent No. GB2444557.

Additional Publications

US Dept of Energy—Energy Efficiency and Renewable Energy Wind and Hydropower Technologies Program. www.eere.energy.gov Solar Powered Satellite Engine. By Franklin K. Chen Space Manufacturing 12, Proceedings of the 14$^{th}$ SSI/Princeton Conference May 6-9 1999.

In a wind-motor, a moving part having impact-surfaces, a casing inclosing said part, a nozzle connected with the casing and arranged to direct air-currents against said surfaces, a movable vane exposed to the air-currents, a plurality of generators operatively connected with the moving part, and means between the vane and generators for controlling the operation of the latter.

In a wind motor of the class described, a rotatable casing open at both ends, a shaft passing vertically through said casing and rotatable independently thereof, and a wind wheel mounted in the rear end portion of said casing and geared in connection with said shaft, the front end portion of said casing being provided with a bell-shaped extension having in the top and bottom and sides thereof, doors which are hinged to said casing, means for manipulating the bottom door to close the front end of said casing, and means for opening and closing the other doors, the bell-shaped extension at the rear end of said casing being also provided in the top thereof with a door which is hinged to the rear end of said casing and which is operated by the same means that operates the door in the bottom of the bell-shaped extension at the front end of said casing.

A wind regulated motor consisting of a horizontally supported tube mounted to be turnable about a vertical axis and having divergent inlet and exit ends, a shaft journaled centrally in the tube with a series of propellers fixed to it at intervals of its length and driven by the air blast passing through the tube, the divergent inlet mouth having openings around its sides and shutters hinged and connected to control the movements of the shutters, a governor driven by the propeller shaft, and connections by which variations in the speed of the shaft will be communicated to open or close the shutters and allow a proportionate amount of air to escape from the inlet funnel without entering the propeller tube.

A wind-powered energy producing device comprising a Venturi-shaped chamber mounted for rotation on a support, a rudder adapted to be acted upon by the wind to orient the openings of the chamber into the wind, and a fan positioned within the throat of the chamber to be acted upon by the wind entering the chamber, the fan being operatively connected to an energy producing device such as a generator or the like.

Wind motors which are propelled by the impact of the wind against the vanes of an impeller wheel, that have wind channeling devices that gather the wind from a large area and funnel it at increased density and pressure to apply multiplied impact against the impeller vanes.

An impeller having an axle with radial vanes is mounted within a housing. The housing includes a funnel to direct a large amount of wind into the impeller. Air fins on top of the housing maintain the funnel pointed into the wind. A flap upon the top of the housing will fold downward as the wind increases and this will raise a throttle valve at the throat of the funnel. In addition, the flap will close exhaust openings from the housing, also reducing the wind on the vanes. Two additional flaps act as pressure relief valves in the funnel which open to dump wind at excessive velocity. Furthermore, a leeward flap on the side of the funnel is blown out to an extended position at high winds which causes the housing to rotate upon its circular tracks to bring the funnel opening away from the wind. The air fins on top of the housing are blown down from the vertical position as the wind strikes the housing sideways. The housing is mounted upon a frame which extends horizontally outward from the housing. The frame is mounted by wheels upon concentric rails. Therefore, the housing can be maintained directly into moderate winds by rotating around upon the rails or high winds will cause the housing to rotate away from the wind. The large frame prevents the unit from blowing over.

An accelerator for a windmill structure as described which is a frustro-conical funnel-like device intended to direct a stream of wind therethrough onto the impeller of a windmill. As the wind passes through the device, it is constricted whereby the velocity increases and exits a throat-like outlet as a diverging jet impacting the impeller blades to thereby increase the kinetic energy available to be converted to mechanical or electrical energy by said windmill. The device of this invention can include a vane for maintaining the accelerator facing into the wind with the windmill, a mounting platform for either the accelerator or both accelerator and the windmill, and an internal configuration to said accelerator to impart a swirling spiral motion to the wind passing therethrough as it is constricted.

A system for collecting and channeling wind energy includes funnel-shaped wind collectors rotatably attached to elevated platforms for collecting wind streams at higher initial velocities. A fantail assembly rotates the inlet end of the funnel into the face of the wind. The funnel is slidably connected to a railing atop the platform to maintain the inlet of the funnel at a desired relationship with the wind stream as well as to preclude separation of the funnel from the platform. Wind entering the inlet of the funnel-shaped collector flows toward a reduced outlet end of the collector resulting in an increased velocity. The collected air is channeled through a tubular branch conduit and merged into a transmission conduit of equal diameter for delivery to a transmission assembly. The transmission assembly includes a nose rotor which compresses and directs air away from the central axis of rotation of a downstream propeller and onto the propeller blades at increased velocity for rotation of an attached drive shaft. Upon use of a plurality of wind collectors, the respective branch conduits are merged into the transmission conduit at spaced intervals therealong so as to increase the velocity of the air stream delivered to the transmission conduit and downstream transmission assembly.

A wind powered turbine has a conduit. A middle conduit portion is located between inlet and outlet conduit portions, having a main inlet and outlet of the conduit, respectively. A rotor having a shaft with blades extending therefrom is located in the middle conduit portion. The blades are located completely within the middle conduit portion. Preferably, a splitter is located in the inlet conduit portion to provide upper and lower sub-tunnels that both feed into the middle conduit portion. Upper and lower interior walls of the middle conduit portion have substantially circular plane shapes that are substantially centered at the rotational axis of the shaft. Upper and lower clearance gaps are located between the blades and the upper and lower interior walls, respectively. The main outlet is preferably higher than the main inlet. Preferably, a generator is located on each side of the conduit and rotatably coupled to the shaft.

A wind power apparatus utilizing an anchor which is rotatably fixed to a surface. A chute attaches to the anchor and is provided with a chamber. A restriction is located in the chamber to concentrate the wind within an annular are of the chute and direct it to a power generator. The power generator is then used to produce electricity, move an object, and the like.

This invention teaches an apparatus, method, means, and computer readable media to address the problem of the inconsistent, unreliable nature of wind, and in particular low-wind speeds, through utilizing a blower and/or startup assist to aid in turning an electricity generating electrical generator during periods of low-wind speed. This generator provides electrical power for an electrolyzer used to generate hydrogen gas from water. Some embodiments include wind speed and direction sensors and control programming and/or circuitry that tracks trends in direction and speed, and anticipate the need to move the direction of the wind-collecting funnel to best take wind into the funnel, and to provide a start-up assist to the wind-powered turbine at a wind speed that is lower than could start rotation of the turbine without assist, or to maintain rotation when the wind temporarily slows below the speed needed to maintain rotation.

A wind energy system comprising a queue of turbines housed in a horizontal air conduit. The inlet end of the conduit opens into a wind collector assembly, which preferably comprises in part downwardly extending earthen slope, such as a hillside or embankment. The wind collector assembly may include a pair of lateral collectors, such as sails, that flank the inlet end of the conduit. An upper collector, similar to a spinnaker, may be included above the shaft and between the flanking sails. The flanking sails preferably are retractable and may be hydraulically controlled. Thus, the wind collector assembly formed by the spinnaker above, the earthen slope below and the lateral sails flanking the inlet, serves to collect wind and channel it into the conduit. Generators coupled to the turbines are electrically connected to a power plant or to an alternate electrical facility on or off the grid.

A wind-driven apparatus for the conversion of kinetic energy in the form of wind to rotational mechanical energy. This apparatus incorporates a funnel (14) that directs wind against a collector (12) causing it to rotate. To prevent any backpressure in the funnel or against the collector, the area immediately downstream of the collector is free of any obstacle or channeling devices. To also prevent any backpressure from developing, a series of blow-through panels (36) form a part of the funnel which open upon the presence of high pressure—the greater the pressure, the greater the opening.

A wind-driven apparatus for the conversion of kinetic energy in the form of wind to rotational mechanical energy. This apparatus incorporates a funnel (14) that directs wind against a collector (12) causing it to rotate. To prevent any backpressure in the funnel or against the collector, the area immediately downstream of the collector is free of any obstacle or channeling devices. To also prevent any backpressure from developing, a series of blow-through panels (36) form a part of the funnel which open upon the presence of high pressure—the greater the pressure, the greater the opening.

The generator has a rotor or impeller (1), and a funnel-shaped nozzle-like sail (2) in front of it, to increase the intake area of the generator. The sail is maintained in inflated condition due to the angle of incidence between it and the wind flow. Anchoring cables (3) have varying anchoring points, which are used to change size, expansion, shape, and position of the sail during operation. The closed funnel-action of the sail is generated by the ground/water surface (4) on one side, and the air flow across it, which inflates the sail. The intermediate transitional areas (5) are technically sealed.

A wind turbine has a funnel shaped inlet 1 which directs the wind onto a rotor 2. The rotor 2 may have a vertical or horizontal axis. The rotor 2 may also be enclosed within a housing and arranged to drive an electric generator 4. Stationary guiding vanes may be provided to guide the wind onto the rotor 2. The wind turbine may be orientated with respect to the wind direction by a wind vane or by an electric motor.

While these wind turbines may be suitable for the purposes for which they were designed, they would not be as suitable for the purposes of the present invention, as hereinafter described.

SUMMARY OF THE PRESENT INVENTION

Referring to Drawing FIGS. 1, 2, 3, 4, and 5 for WCWM summary discussions below:
(WCWM: Wind Cone Windmill)

Wind velocity vector v passing through the screen s and move inside the wind cone a. As the wind cone diameter reduce in size, which cause the wind speed to increase. This amplifies wind dynamic pressure from $(1/2)\rho(V_1)^2$ to $(1/2)\rho(V_2)^2$. Where $V_1$ is initial wind velocity at cone radius $r_1$ and $V_2$ is the wind velocity at cone radius $r_2$ ($r_2<r_1$). The wind dynamic pressure are increased from initial radius $r_1$ to a down stream smaller radius $r_2$ by a factor of $[(r_1/r_2)^2-1]$ times of initial dynamic pressure at $r_1$, where $r_1>r_2$. This amplification effect of the wind cone design is not achievable in current wind mill propeller blade designs. This concentrated wind force is discharged onto the rotating turbine blade b before exhaust along a vertical plane behind the cone. This process converts the wind kinetic energy into mechanical rotational energy. The rotational energy is transmitted from sprocket wheel l through sprocket wheel m by chain c. Then, transmitted from sprocket wheel m' to sprocket wheel n by chain d. Next from bevel gear f to bevel gear g. Bevel gear g is attached to vertical shaft h, thus any rotation of g will cause rotation of h. The lower end of h is connected to a gear box followed by an electricity generator near the ground (not shown). A screen s is placed in front of cone a, to protect the birds from flying into the cone. The turbine disk w is in a vertical plane centered to the cone. The cover i protects turbine disk w and turbine blades b. This cover reduces turbine noise. Also, cover i is shaped as a rudder behind the cone to allow tube q to rotate about the stationary pipe p, thus automatically adjusting WCWM air intake azimuth to changing wind directions.

Referring to Drawing FIGS. 6, 7, and 8 for RH/WCWM summary discussions below:

(RH/WCWM: Ram Horn/Wind Cone Windmill)

A variation of WCWM bends a canvas shaped wind cone into a ram-horn shape. And redirect the wind kinetic energy toward a turbine located at the ram-horn tip near the ground. This is presented here as RH/WCWM. The previous WCWM discussions on concentration and amplification of wind dynamic pressure towards the wind cone tip also apply to RH/WCWM.

RH/WCWM canvas shape is formed by many different straps of canvas a5 stitched together to form a ram-horn shape. In the front of this stitched ram-hone canvas a5 is supported by posts p5, p6, p7, and p8 arranged into a rectangular frame, where the stitched canvas a5 is wrapped around the posts p5, p6, p7 and p8. This stitched ram-horn canvas a5 is supported by two pressurized compartments b5 and c5: where b5 supports the inner ram-horn canvas contour a5, b5 is attached to a5 and stationary plate k6. Similarly, c5 supports the outer ram-horn canvas contour a5, c5 is attached to a5 and stationary plates k5. The tip u5 of ram-horn shaped canvas a5 is wrapped around the turbine t5 inlet duct m5. The turbine and its inlet m5 and outlet ducts n5 are attached to stationary plate k5 and k6. Turbine drive shaft s5 transmits the converted mechanical energy pass gear box g4 to drive the electricity generator g5. An air compressor Q5 is used to pressurize the sealed air chambers b5 and c5.

The top horizontal support bar p6 is held high by steel cables w5 and w6 which are attached to p6 at x5 and y5 respectively. w5 and w6 run through the vertical posts p5 and p7 respectively before connecting to motor driven wrenches z5. In order to prevent damage to RH/WCWM when wind conditions exceed RH/WCWM design limit, the air inside chambers c5 and b5 will first be pumped out, this allow the wrench z5 to lower the horizontal post p6 and thus make the ram-horn shape canvas a5 to collapse.

A large screen (not shown) is placed in front of the RHWM frontal area to prevent birds from flying into the RHWM.

By design and stitching different shapes of canvas a5, together to make a wind cone with graduate cross section reduction and graduate bend, there can be infinite number of bended wind cone shapes: from RH/WCWM illustrated in FIG. 7, to a straight wind cone illustrated in FIG. 1.

RH/WCWM can be located on land, on ocean going factory sailing ships or on floating platforms anchored offshore. Some of these land applications may require simple modifications to adjust for changes of wind azimuth directions. Ocean sailing factory ships can be used to harvest potable water, liquid hydrogen and oxygen for fuel cells to use in homes, cars, trucks, ships and industries.

Referencing to Drawing FIGS. 9, 10, 1112 and 13 for WCWM/EHFS summary discussions below:

(WCWM/EHFS: Wind Cone Windmill/Energy Harvesting Factory Ship)

A large wind cone 8a is placed as a sail on the top surface of a ship. This wind cone has a rectangular frontal opening and this opening is sloped in its side view. A rectangular screen 8s covers the entire wind cone frontal area to prevent birds from flying into this wind cone. A smaller rectangular plate 8n is hinged along the bottom frame of wind cone opening, A large rectangular plate 8m is hinged along the top frame of this wind cone opening. Both of these plates 8n and 8m can rotate about their respective hinge lines in ranges identified by 9b and 9a respectively. The lower plate is designed to prevent high waves entering into the wind cone 8a. The upper plate 8m is designed to catch more wind energy above the ship. Both plates 8m and 8n can be rotated next to the screen 8s to close the wind cone entrance area during very high wind conditions. Rotational controls of plates 8n and 8m will be discussed later.

8w can be a mixture of wind plus rain plus snow plus ocean waves and the turbine 8b is designed for this mixed fluid. After 8w passed 8b it exits the ship. Excessive rain and wave water which did not pass through 8b are flow back down the cone 8a and exit the ship through two drain ports 8d and 8d' on either sides of the ship. The turbine shaft 8x is connected to a gear box 8g' and to an electricity generator 8g. The 8g' and 8g sit on top of a fixed structure 8r' which also serves as a vertical fin. A rudder 8r is located above 8g. There are two additional electricity generators 11g which will be discussed later.

In normal operation, this ship is rotated to have its wind cone opening facing the wind. This ship's directional controls can be controlled using some of the following six subsystems, which can operate independently, or simultaneously based on wind and/or ocean current conditions. These six control subsystems are:

First a fixed vertical fin 8r' and a rudder 8r are located behind the turbine 8b air exit. 8r is used for fine ship directional controls.

Second, two rudders 9r and 9r' are located on either sides of the ship's rear end. These rudders can provide more powerful directional controls, whenever there is a sea current movement relative to the ship.

Third two side fins 11f and 11f' are located on each side of this ship below the water line. When closed, these fins are attached to the ship's side surfaces. These side fins 11f and 11f' each can independently rotate from zero degree to 180 degrees. These fins' operational conditions are: (1) When the wind pushes the ship back too fast, these fins 11f and 11f' serve as ship's brake to allow the ship to stay longer at a favorable wind location without drop the anchor. (2) When the surface wind direction and sea current flow direction alignment is not favorable. (3) When there is a need to make a quick ship heading change maneuver. (4) When the ocean depth is not suited to drop ship's anchor. These side fins 11f and 11f' when partially opened, each acts like a two dimensional hydraulic cone. They force sea water 11w into ducts 11e. These ducts are located on either sides of the ship with sea water 11w power turbines 11b to generate more electricity from two 11g.

Forth, two propellers 8p and 8p' located at ship's end. These propellers are driven by electric motors powered by fuel cells energy harvested by this ship early.

Fifth, four water jets 8i and 8i' located on the ship's front sides and 8j and 8j' located on the ship's back sides. These water jets are propelled by turbines powered by fuel cells supplied by the ship's factory.

Sixth, ordinary anchor is used when conditions are favorable. Once anchored, minor ship azimuth direction adjustment can be made by techniques discussed early. This ship can be anchored off shore to harvest tidal energy.

Controlling the ship's control surfaces $8r$, $9r$, $9r'$ $8m$, $8n$, $11f$ and $11f'$ can each be performed independently by release-and-pull on its respective pair of wires $11c$ and $11c'$. Only a discussion of controlling fin surface $11f$ is given below to illustrate this technique: Two wires, identified as $11c$ and $11c'$ are fixed at a point $11t$ at the unhinged edge of fin $11f$. Then each wire $11c$ and $11c'$ first loop pass their respective rollers $11q$ and $11q'$, before wrap round their respective drums $11d$ and $11d'$. By synchronize rotations of these drums, will resulted in lengthening/shorting or shorting/lengthening unwrapped portion of these wires $11c$ and $11c'$. This action causes the fin $11f$ to open or close. $11d'$ can be eliminated if $11c'$ is also wrapping round $11d$ in the same direction of $11c$. All other surfaces $8r$, $9r$, $9r'$, $8m$, $8n$ and $11f'$ can be controlled the same way. To avoid cluttering up the figures, only $11f$ and $11f'$ surfaces controls are illustrated in FIG. 12. Of course, these surfaces can also be controlled by hydraulic or by other means.

This ship can have four different ways to generate electricity. They are:

First a generator $8g$ located near the wind cone end as discussed early.

Second, two generators $11g$ located on ship sides near the side fins $11f$ and $11f'$. These two generators become operational when their corresponding side fins $11f$ or $11f'$ are independently open and each side fin acts as a two dimensional hydraulic cone. These hydraulic cones force sea water $11w$ to flow in their respective circular arc shaped tube $11e$ located near each lower side of this ship. A turbine $11b$ is located at the middle of each tube $11e$, where $11e$ cross sectional area is smallest. Two screens $11s$ and $11s'$ are located at each end of each tube $11e$ to prevent fish from entering the tube. Forced by the two dimensional cone $11f$ (or $11f'$) created, sea water forced through $11e$ and passed through turbine $11b$ and finally exiting the ship at the other end of $11e$. A gear box before each electric generator $11g$ is located above their respective turbines $11b$.

Third, for very large wind cone, additional wind ducts can be attached near wind cone's end to allow more air $8w$ exit the cone. These ducts are open only under very high wind conditions. These additional wind ducts can be arranged symmetrically around in a circle around a large center wind duct. Each one of these wind duct is connected to its own turbine just like the one illustrated by $8g$ discussed early. This multiple wind ducts configuration on a single large wind cone is discussed but not illustrated in this application.

Fourth Solar cells can be installed over the ship's surfaces. The use of solar cells is mentioned later.

In addition to harvesting wind energy and/or ocean current energy in high seas, these ships have other potentials. They are:

First in the future these ships may utilize or request favorable wind conditions from central weather computers. Where requested wind conditions may be generated by satellites in polar orbits.

Second, since winds are produced by the sun's uneven heating of the earth and since this ship is design to take out and store some of this energy on board. It is seasonable to speculate that when a very large number of these ships are concentrated in a small area they may alter the local ocean surface air and local ocean surface water conditions however small.

While harvesting the wind and/or ocean current energies, these ships can be used to simultaneously conduct the following weather modification studies:

(1) To study the hurricane characteristics during its early stage of formation by placing a very large number of these ships in a small region where annual hurricane originates. This may leads to better understanding hurricane characteristics during its formation and possibly modify some hurricane characteristics.

(2) To study means to modify a hurricane path by distribute a very large number of these ships along a predicted hurricane path. Such as cover these ships with solar cells and/or reflective paint to further lower ocean surface temperatures, thus deny energy needed by the hurricane.

(3) To study the safety boundaries along predicted hurricane path for harvesting hurricane energy with ships of different design specifications.

(4) Improve ship designs to allow energy harvesting factory ships to sail closer to rough seas. This will require improved design of wind cone and its turbines to accept high density fluid consists of wind, rain, snow and/or waves.

(5) To study the submarine design specifications in term of its safety path boundaries for harvesting hurricane energy by submarines.

(6) To create a global business to auction energy harvesting factory ship routes schedule.

Third These wind cone wind mills can be used to harness high density wind energy from sand storms:

(1) By temporarily anchoring windmills in the desert.

(2) To study the possibility of modifying desert topography; by anchoring a very large number of wind cone windmills in strategic locations in the desert. This may reduce sand or dust from blowing to cities hundreds of miles away.

The primary objective of this invention is to provide wind cone and/or various configuration of ram horn bended shape wind cone on ships. These ships can be anchored off shore and/or roaming the oceans for favorable wind conditions. Such as at a safe distance near predicted hurricane route or between high and low air pressure regions. Each ship will harvest and then transform the wind kinetic energy to electricity. The electricity will be used to separate pre-stored fresh water (or collected rain water) into oxygen and hydrogen gases. Part of these oxygen and hydrogen gases will be used to supply fuel cells to power the ship. Other part of these gases are stored on board the ship for later global distribution on land or at sea.

Another object of the present invention is to provide straight wind cone and/or ram horn type wind cone turbines having a housing comprising a configurable frame and pliable fabric skin producing a lightweight housing.

Another object of the present invention is to provide wind cone and/or various bend of ram horn turbine using pressurized bladders to create the diametrically decreasing throat of the housing.

Yet another object of the present invention is to provide wind cone and/or ram horn wind turbine having a turbine positioned at the terminus end of the horn whereby the amplified wind velocity turns the blades before exiting the rear of the housing.

Still yet another object of the present invention is to provide wind cone and/or ram horn wind turbine having linkage extending from the turbine to a ground positioned electrical generator to reduce manufacture, installation, and maintenance cost.

Another object of the present invention is to provide wind cone and/or ram horn wind turbine that can be used on land, land vehicles and watercraft.

Yet another object of the present invention is to facilitate people with limited financial resources to harness wind energy by building low cost simple wind cones with small low cost turbines.

Still yet another object of the present invention is to shift the high cost of large propeller wind turbines to low cost smaller wind turbines.

Additional objects of the present invention will appear as the description proceeds.

The present invention overcomes the shortcomings of the prior art by providing a wind cone windmill to transform fluid kinetic energy into electricity that can be used to extract potable water from sea water and also used to separate oxygen and hydrogen from water and stored on board a ship. Applications are scalable for land, land based vehicles and structure and water craft.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
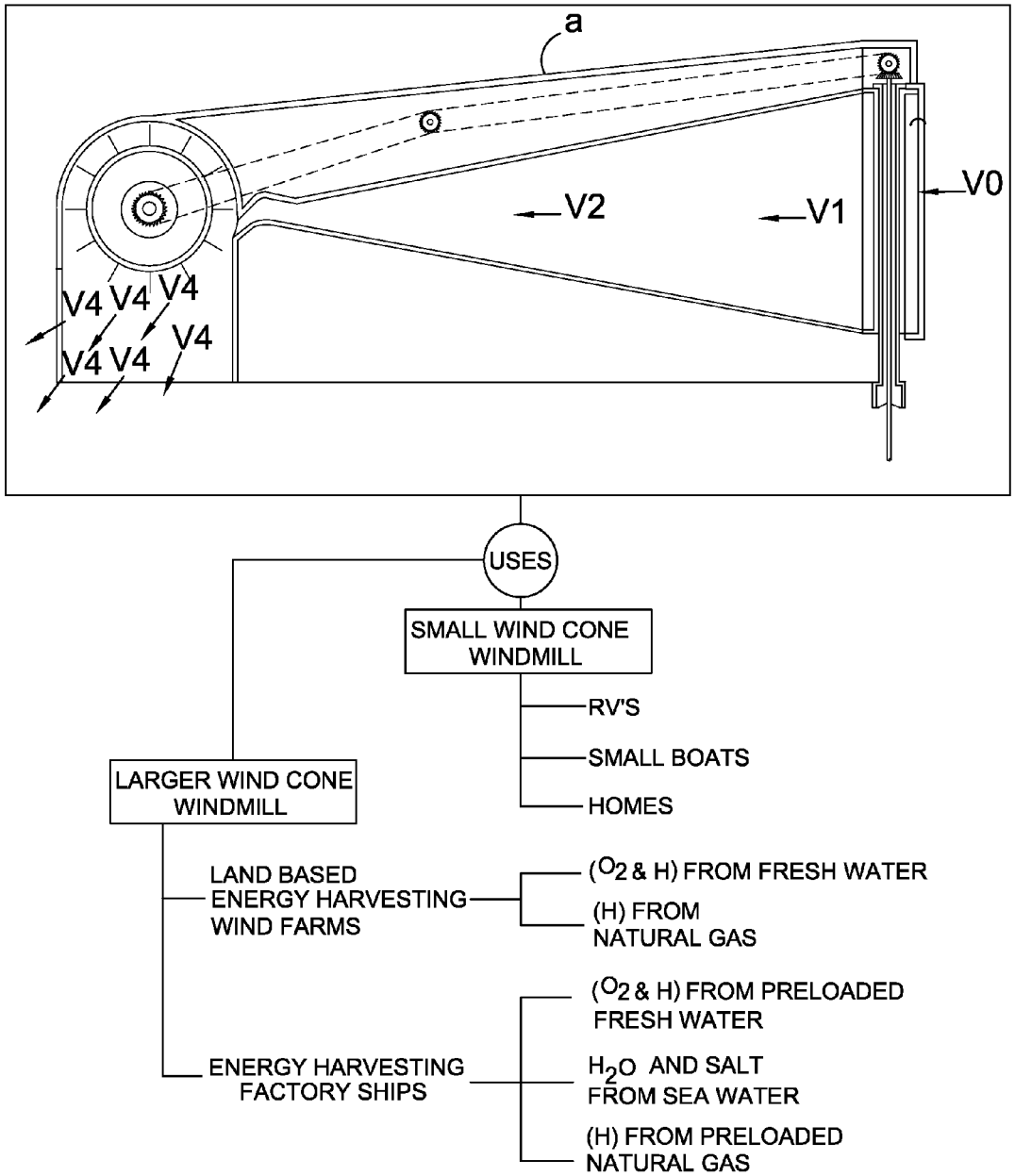
FIG. 1 is an illustrative view of the present invention's uses.

Turning now descriptively to the drawings, in which similar reference characters denote similar elements throughout the several views, the figures illustrate the electronic book of the present invention. With regard to the reference numerals used, the following numbering is used throughout the various drawing figures.

| | |
|---|---|
| a | wind cone |
| a1 | circular ring |
| a5 | ram-horn "canvas" strip |
| b | turbine blades |
| b5 | pressurized compartment |
| c | chain |
| c5 | pressurized compartment |
| d | chain |
| e | WCWM narrow section (FIG. 2) |
| e | WCWM/EHFS (FIG. 13) |
| e' | narrow exhaust area of wind cone |
| f | bevel gear |
| g | bevel gear |
| g4 | gear box |
| g5 | electrical generator |
| h | vertical shaft |
| H1 | hurricane position 1 |
| H2 | hurricane position 2 |
| H3 | hurricane position 3 |
| H4 | hurricane position 4 |
| i | cover |
| k | fin |
| k5 | stationary plate |
| k6 | stationary plate |
| l | sprocket wheels |
| m | sprocket wheels |
| m' | sprocket wheels |
| m5 | turbine inlet duct |
| n | sprocket wheels |
| n5 | turbine outlet duct |
| p | stationary tubular post |
| p5 | vertical support post |
| p6 | top horizontal support post |
| p7 | vertical support post |
| p8 | bottom horizontal support post |
| q | tube |
| Q5 | air compressor |
| r5 | pulley wheel |
| r6 | pulley wheel |
| s | screen |
| s5 | turbine drive shaft |
| t5 | turbine |
| u | path of hurricane |
| u5 | tip of ram-horn |
| v0-4 | WCWM wind velocity vectors |
| v1-7 | RH/WCWM wind velocity vectors |
| w | turbine hub |
| w5 | steel cable |
| w6 | steel cable |
| | WCWM/EHFS e (WCWM/EHFS) |
| x | shaft |
| x5 | point where w5 connects with p6 |
| y | shaft |
| y5 | point where w6 connects with p6 |
| z | shaft |
| z5 | motor driven winches |
| 8a | wind cone |
| 8b | turbine |
| 8d | drain port |
| 8d' | drain port |
| 8g | electrical generator |
| 8g' | gear box |
| 8i | water jet |
| 8i' | water jet |
| 8j | water jet |
| 8j' | water jet |
| 8k | work/storage compartment |
| 8m | rotatable upper panel |
| 8n | rotatable front lower panel |
| 8p | propeller |
| 8p' | propeller |
| 8r | rudder |
| 8r' | vertical stationary fin |
| 8s | tilted screen |
| 8w | wind vectors |

| | |
|---|---|
| 8x | turbine shaft |
| 9a | angular rotation range of 8m |
| 9b | angular rotation range of 8n |
| 9k | pressurized storage tanks |
| 9r | rudder |
| 9r' | rudder |
| 101 | sea level |
| 11b | sea water turbine |
| 11c | control wire |
| 11c' | control wire |
| 11d | cylindrical drum |
| 11d' | cylindrical drum |
| 11e | sea water duct |
| 11f | side fin |
| 11f' | side fin |
| 11g | generator |
| 11q | roller |
| 11q' | roller |
| 11s | screen |
| 11s' | screen |
| 11t | attachment of 11f to 11c and 11c' |
| 11t' | attachment of 11f' to 11c' and 11c |
| 11w | sea water |
| 13L | land mass |

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

FIG. 1 is an illustrative view of the present invention's uses. The present invention is a wind cone windmill to transform all the fluid kinetic energy passing through wind cone frontal area into electricity. Also, the wind cone outside surface can be covered with solar cells. The electrical energy harvested by wind cone wind mill can be used to extract potable water from sea water and also the energy can be used to separate oxygen and hydrogen from water and stored on board a ship for later distribution in addition to supply power for on-board fuel cells. This will provide free energy to allow the ship to roaming the ocean seeking best wind conditions and distribute clean energy and portable water globally. Two designs of wind cone windmills for common applications are presented. They are low cost scalable for RV's, small boats or homes. This is followed by a large wind cone windmill adapted to land based wind farms and to ocean sailing energy harvesting factory ships. These applications will generate and store renewable clean energy and potable water, simultaneously create green jobs in manufacturing, ship building, global renewable clean energy distributions, global portable water distribution, renewable clean energy for transportation and financial markets, etc. Also shown are the wind velocity vectors v0-4 relative to the cone a.

Figure 2:
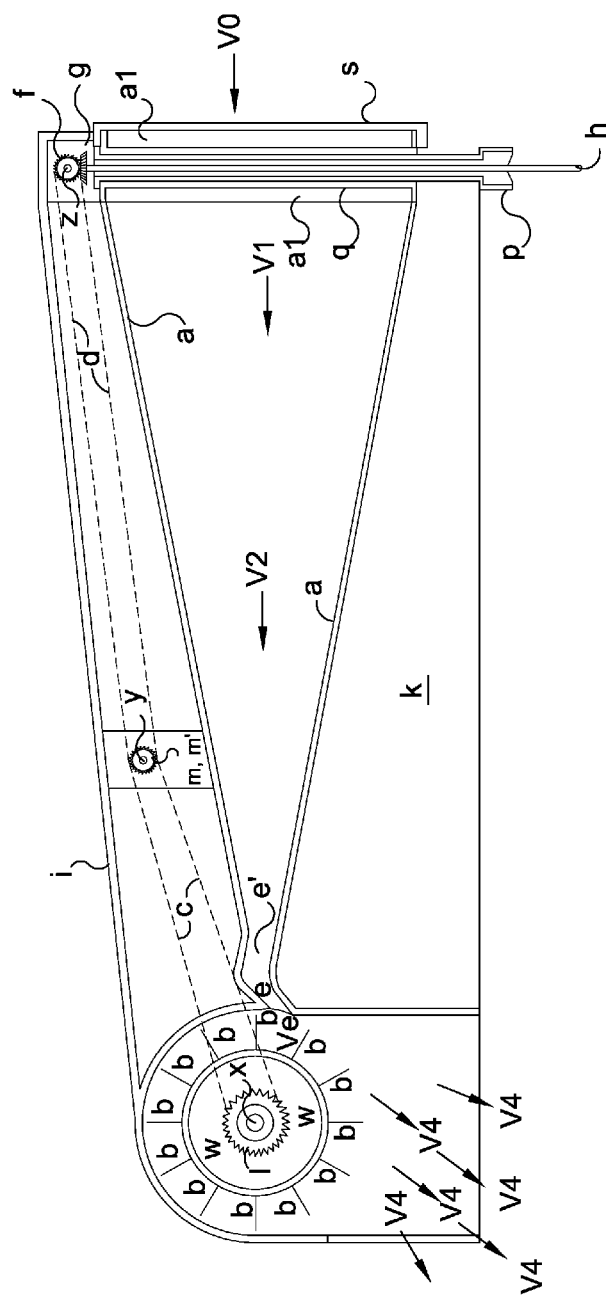
FIG. 2 is a sectional side view (section AA of FIG. 3) of a typical wind cone windmill (WCWM).

FIG. 2 shows a sectional side view of a typical wind cone (WCWM). It is sectional A-A view of FIG. 3. The cone is identified by a, below cone a is a fin k which also acts as a support of the weight above it. Behind the cone a are: turbine hub w, turbine blades b, sprocket wheels (l, m, m' n and m' are visible in FIG. 3), chains c and d, bevel gears f and g and top cover i. The front of cone a is attached to a circular ring a1. A tube q passes through and wielded on the circular ring a1. In front of circular ring a1 is a circular screen s. A long tubular post p fixed to the ground at its lower end (outside FIG. 2) and run through inside tube q at its upper end. Post q is wielded on a1, it services as a support of wind cone windmill (WCWM) and it allow the wind cone windmill to rotate about p as the wind direction v0 changes. Wind vector v1 passing the s and increase it magnitude v2 and pass through narrow section e hitting and turning the turbine blades b. Finally, v4 exit behind turbine along WCWM central vertical plane.

Figure 3:
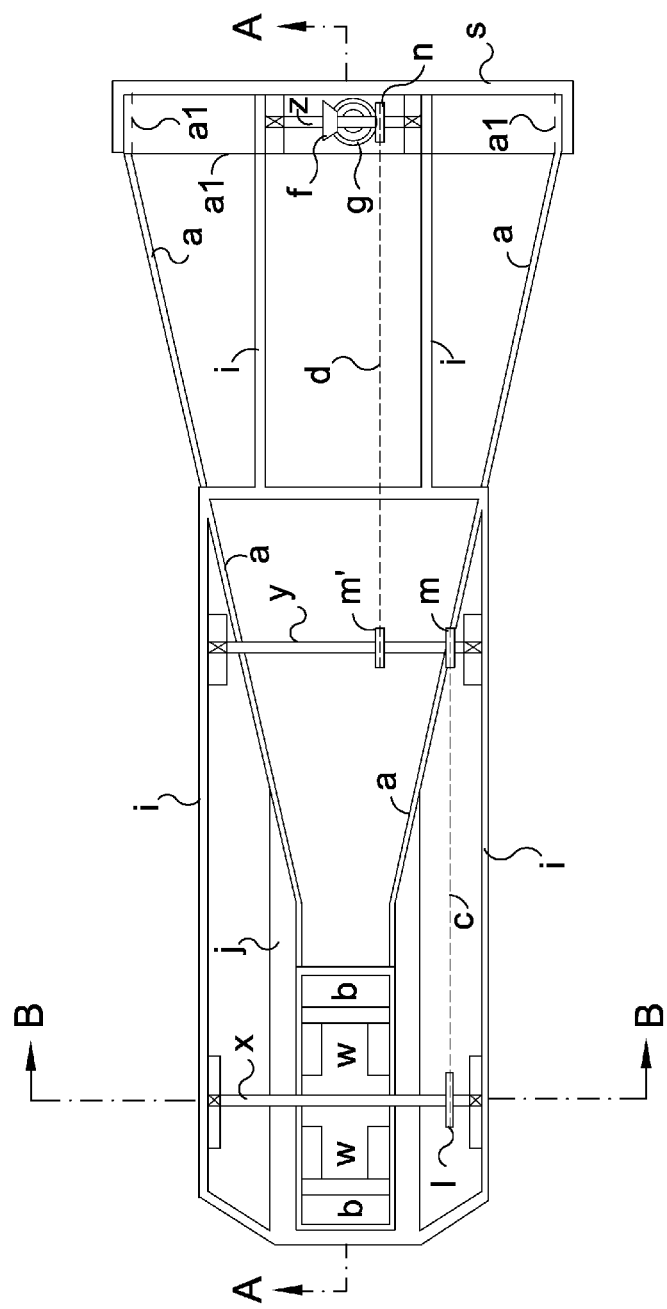
FIG. 3 is the top view of wind cone windmill (WCWM).

FIG. 3 is the top view of wind cone windmill (WCWM). The wind cone is identified as a. A shaft x is attached to both turbine hub w and sprocket wheel 1. Another shaft y is attached to two sprocket wheel m and m'. A third shaft z is attached to both sprocket wheel n and bevel gear f. Two chains: chain c connecting sprocket wheel 1 and m and chain d connecting sprocket wheels m' and n. Bevel gear g is fixed at the top end of vertical shaft h of FIG. 2. Therefore any turbine rotation will cause the shaft h to rotate inside the stationary post p, thus transmitting the turbine blades' rotation to the electrical generator at the lower end of shaft h (not shown in FIG. 2).

Two sections, identified as A-A and B-B, are shown in FIG. 3. These sectional views are illustrated in detail in FIG. 2 and FIG. 4 respectively.

Figure 4:
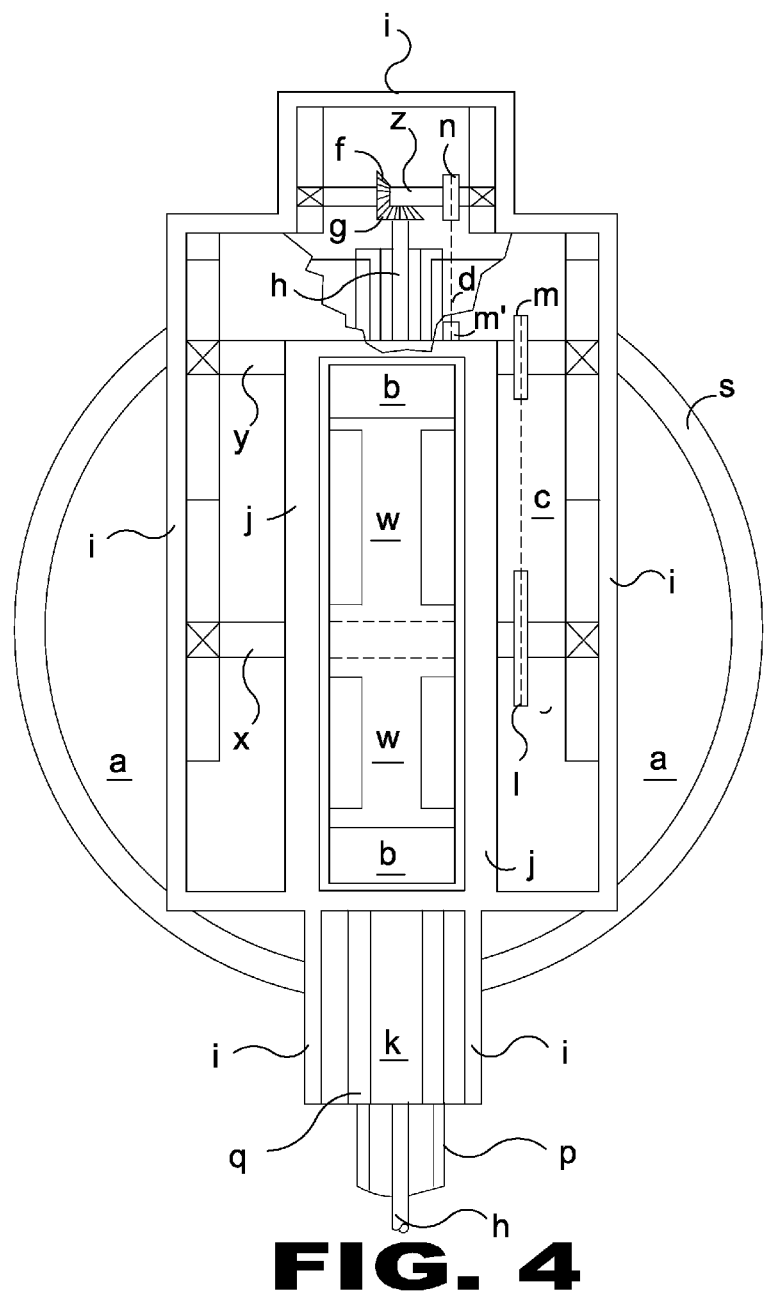
FIG. 4 is an end view of section B-B of FIG. 3.

FIG. 4 is an end view of section B-B of FIG. 3. It illustrates the connection of turbine blades b and turbine hub w to shaft x and the connection of sprocket wheel l to the same shaft x. The connection of sprocket wheels 1 and m by chain c. The sprocket wheels m and m' are on the same shaft y. The sprocket wheels m' and n are connected by chain d. The sprocket wheel n and bevel gear f are on the same shaft z. The connection between bevel gears f and g. Finally, the connection of bevel gear g and shaft h, where g is attached to the top end of vertical shaft h, the lower end of h is attached to the electricity generator (not shown) near the ground.

Figure 5:
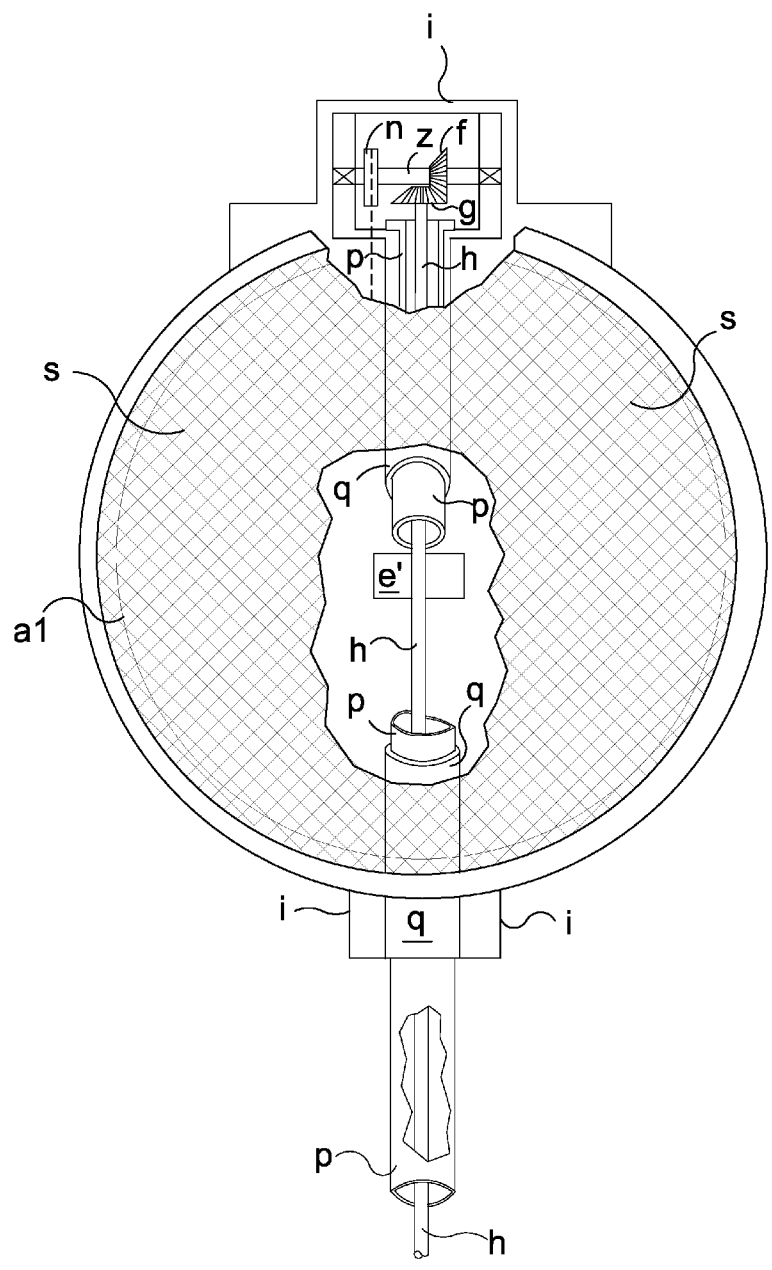
FIG. 5 is the front view of Wind Cone Windmill.

FIG. 5 is the front view of Wind cone windmill. It shows the bevel gears f and g, the sprocket wheel n, the circular tube q (attached to ring a1 in FIG. 2), the long stationary tubular post p, the rotating vertical shaft h (attached to bevel gear g), the wind cone's narrow exhaust area e' (FIG. 2), screen s, and a portion of the top cover plate i. NOTE: A larger cone section together with a larger screen s could be designed in front of ring a1 of FIG. 5 (not shown). This will allow all mechanical sprocket wheels and gears to be hidden behind the WCWM frontal view.

Figure 6:
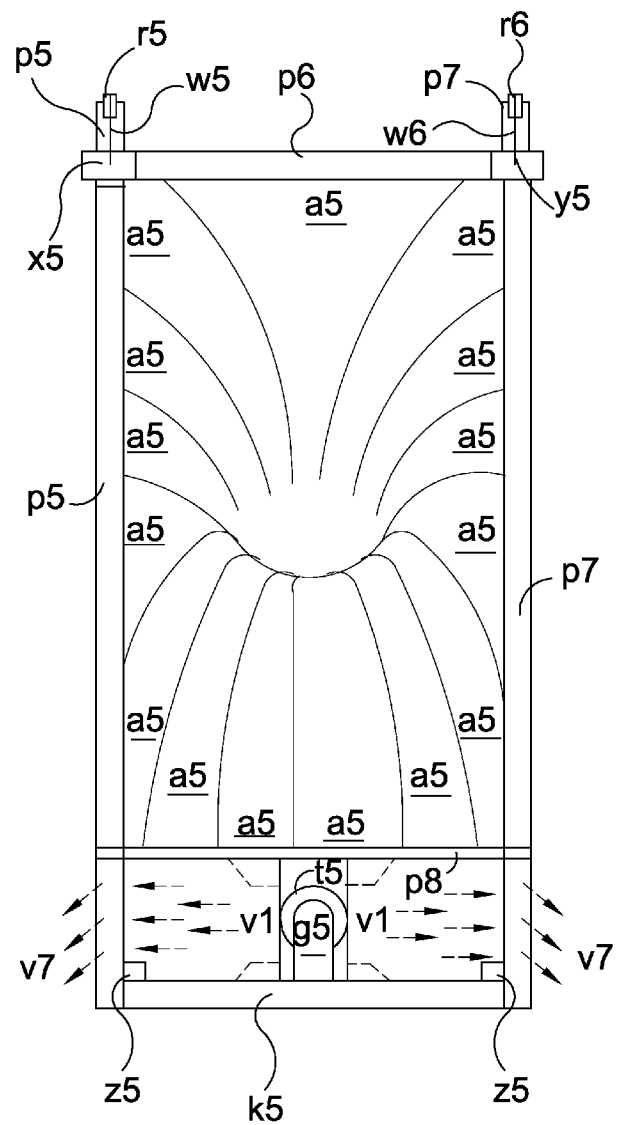
FIG. 6 is a front view of Ram Horn Wind Cone Windmill (RH/WCWM).

FIG. 6 is a front view of RH/WCWM. It shows the two vertical posts p5 and p7, top horizontal post p6 and bottom horizontal post p8. Cuts of different shape of canvas straps a5 are stitched together to form a ram horn shape. The stitched canvas a5 are wrapped around posts p5, p6, p7 and p8. On top of posts p5 and p6 are two rollers r5 and r6, where the steel cables w5 and w6 pass respectively. One end of cable w5 is fastened to the end of horizontal post p6 at x5, then wrap around the pulley wheel r5 and then pass through the center of post p5 to the bottom of p5 before connecting to a electric motor driven wrench z5. This is the same for wire w6 starting at y5, then passing over r6 and inside p7 before connecting to wrench z5. The wrench z5 rise or lower p6. Also shown in this figure are the electricity generator g5 and the air exhaust v7 after passing the turbine t5. k5 is the base plate. A separate screen (not shown) to protect the birds will be placed in front of RH/WCWM.

Figure 7:
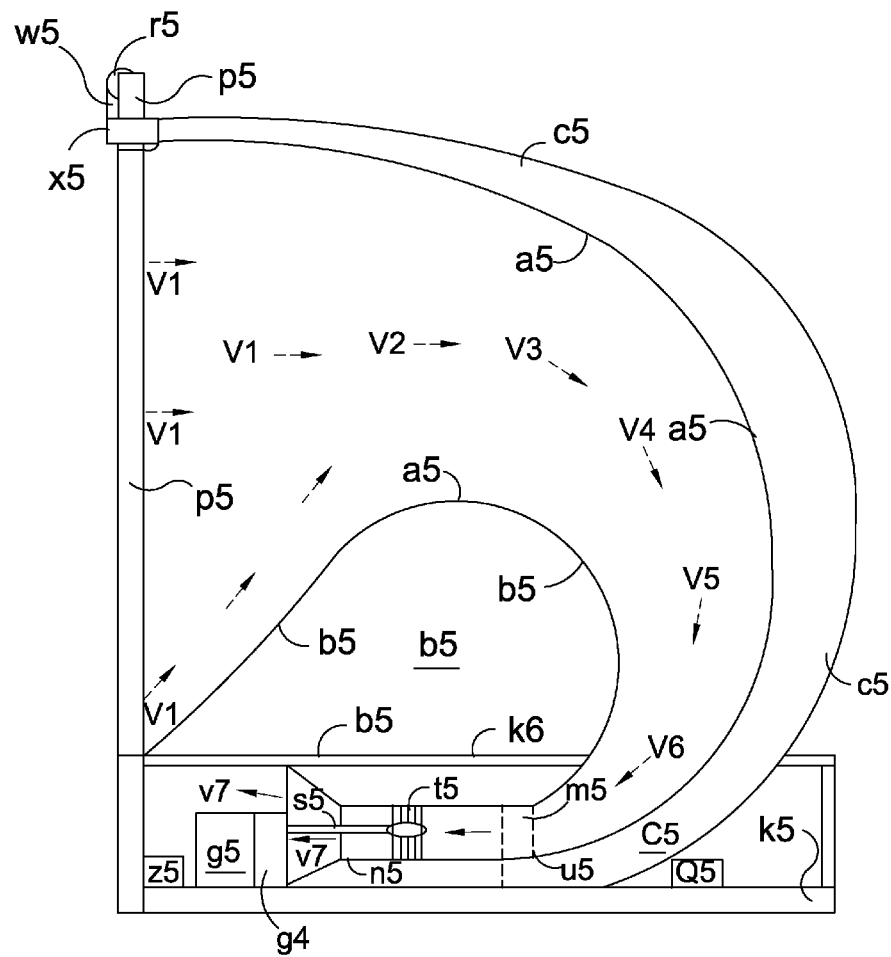
FIG. 7 is a sectional side view of RH/WCWM as viewed from a vertical plan cut in the middle of FIG. 6.

FIG. 7 is a sectional side view of RH/WCWM as viewed from a vertical plan cut in the middle of FIG. 6. It illustrates its ram-horn shape. The front of ram-horn shaped canvas is supported by the posts p5, p6, p7 and p8. The curvatures of the ram-horn shaped canvas a5 are supported by two pressurized compartments b5 and c5. The compressor and its associated controls are identified as Q5. The turbine is located at the tip u5 of ram-horn canvas a5. The turbine t5 inlet duct m5 is attached to and supporting the ram-horn canvas tip u5. s5 is the turbine shaft which connects to the gear box g4 and electricity generator g5. Note wind v1 enter the RH/WCWM and gradually increasing in speed to v2, v3, v4, v5 and v6 as the ram-horn cross sections gradually decreasing towards the ram-horn tip u5. After passing the turbine blades t5, air is exhausted into the atmosphere v7 through louvers on both sides of the generator g5. RH/WCWM sit on top a base plate k5.

Figure 8:
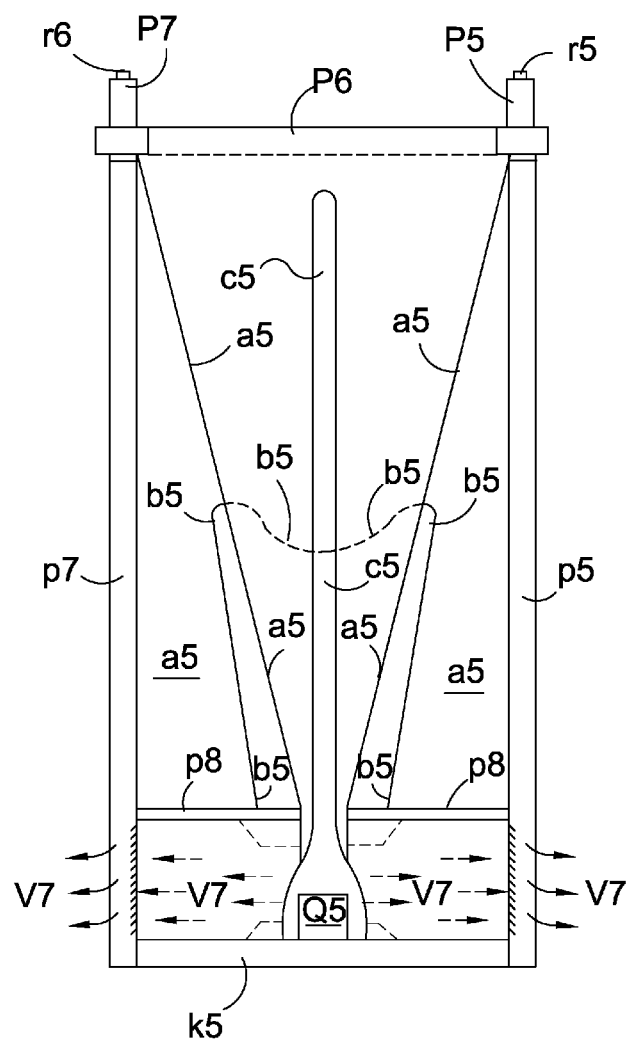
FIG. 8 is the rear view of this RH/WCWM.

FIG. 8 is the rear view of this RH/WCWM. It illustrates the rear ram-horn shape and the rear view of two pressurized compartments b5 and c5 which hold the stitched canvas a5 in its ram-horn shape.

Figure 9:
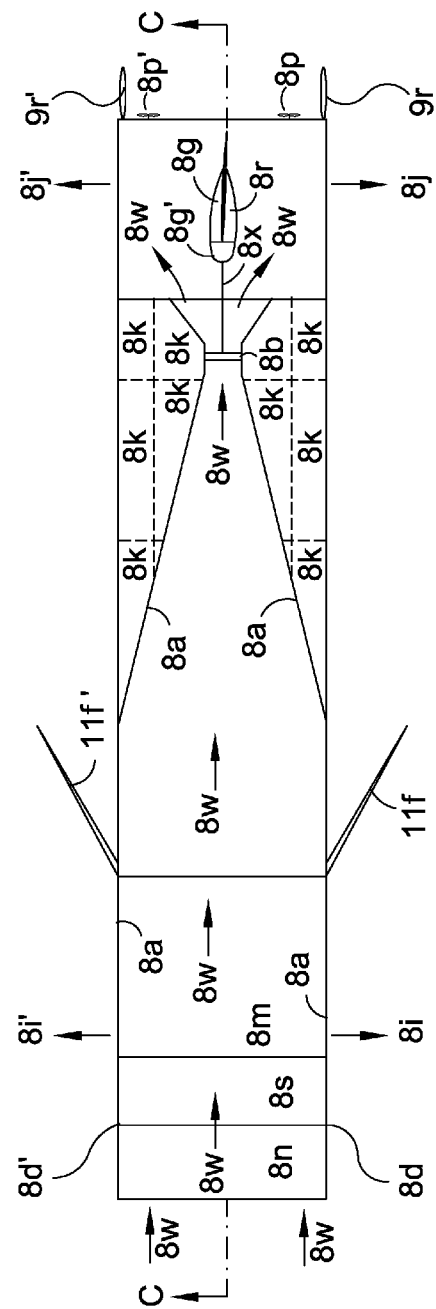
FIG. 9 is a top view of this Wind Cone Windmill/Energy Harvesting Factory Ship (WCWM/EHFS).

FIG. 9 is a top view of this Wind Cone Windmill/Energy Harvesting Factory Ship (WCWM/EHFS). It illustrates a wind cone 8a on top of the ship, wind vectors 8w flow through 8a, the turbine 8b, the turbine shaft 8x, gear box 8g', electricity generator 8g, the rudder 8r on top of 8g, ship's two rear end rudders 9r and 9r', two propellers 8p and 8p', four water jets 8i, 8i', 8j, 8j'; FIG. 9 also shows the wind cone's rotatable front lower panel 8n, a tilted rotatable upper panel 8m and a portion of the tilted screen 8s which covers the entire wind cone 8a entrance area. In addition, FIG. 9 shows two partially opened side fins 11f and 11f', locations of work/storage compartments are identified as 8k inside dashed lines.

Figure 10:
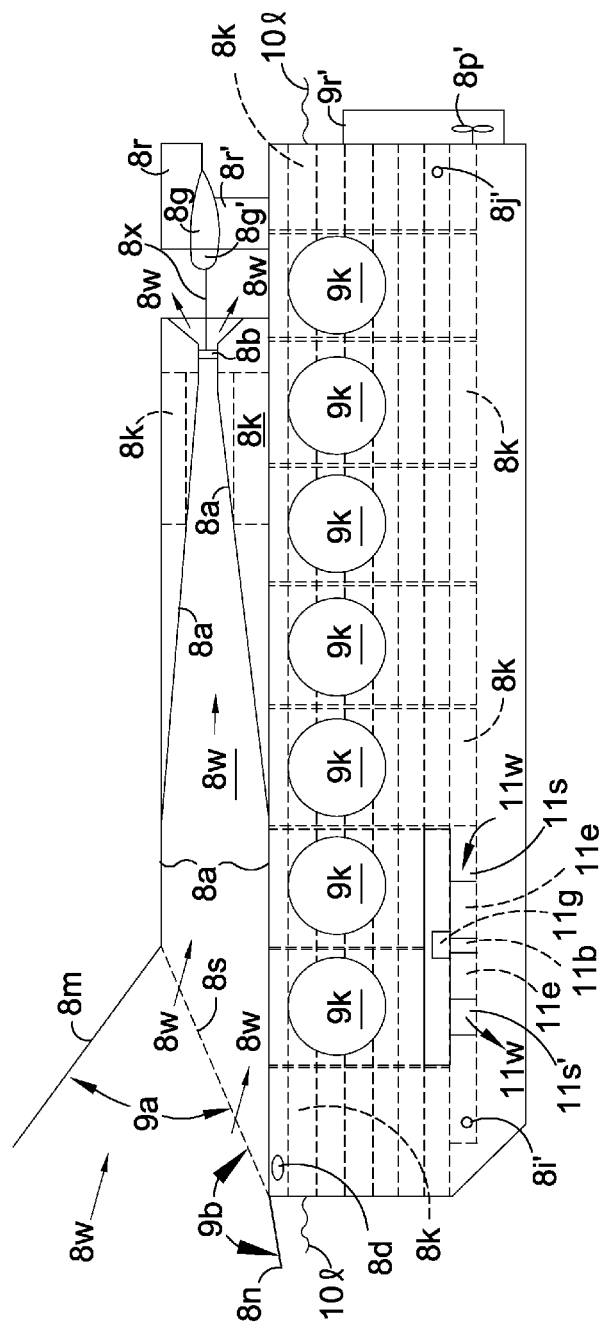
FIG. 10 is a side section C-C view of FIG. 9.

FIG. 10 is a side section C-C view of FIG. 9. It shows the wind cone 8a on top of this ship, the front sloped screen 8s is shown as dashed line, the raised top front panel 8m and its angular rotation range 9a, the lower front panel 8n and its angular rotation range 9b, wind vectors 8w flow through 8a and wind cone turbine 8b, the turbine shaft 8x, the vertical stationary fin 8r' which supports 8g', 8g and rudder 8r, one of the ship's end rudders 9r' one of the ship's propeller 8p', two of the ship's four water jet locations 8i' and 8j', sea water duct 11e, sea water 11w flows into and out of duct 11e, screens 11s and 11s' cover duct 11e openings, sea water turbine 11b at middle of 11e, generator 11g, sea level 101, location of seven large pressurized storage tanks 9k and various working and storage spaces 8k are inside the dashed lines. In addition to separate the horizontal working/storage compartments the vertical dashed lines in FIG. 10 also represent locations of the elevators.

Figure 11:
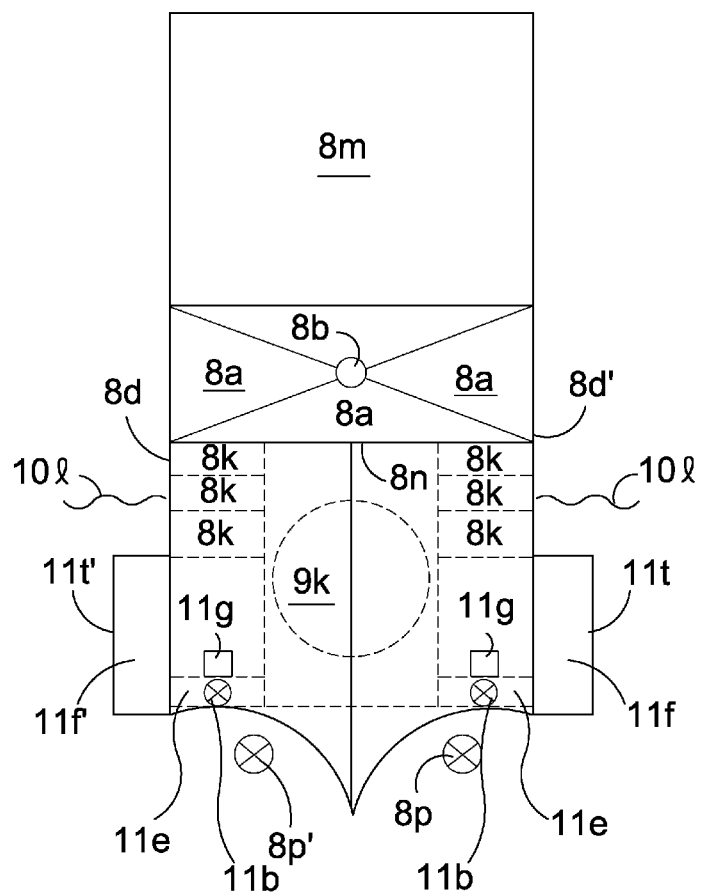
FIG. 11 is a front view of the Wind Cone Windmill Energy Harvesting Factory Ship (WCWM/EHFS) of the present invention.

FIG. 11 is the front view of this WCWM/EHFS. Shown is the raised wind cone 8a front top panel 8m, the wind cone 8a front lower panel 8n in its horizontal position, the wind cone 8a turbine 8b, the pressurized storage tanks 9k shown in dash, the ship's twin propellers 8p and 8p', two partially opened side fins 11f and 11f', sea level is represented by 101, the working or storage compartments 8k are represented by dashed lines, two sea water ducts 11e, two sea water turbines 11b, two generators 11g. Points identified as 11t and 11V on side fins 11f and 11f' respectively are location where side fin control wires 11e and 11e' are attached to these side fins.

Figure 12:
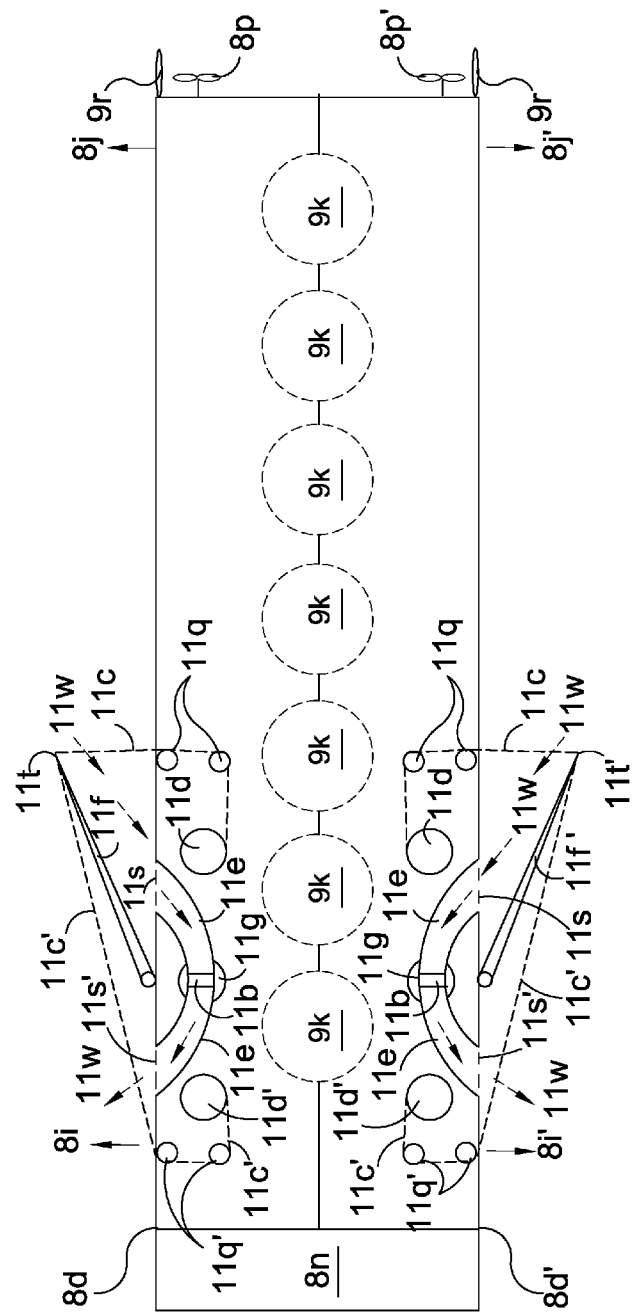
FIG. 12 is a bottom view of this ship identified as WCWM/EHFS.

FIG. 12 is the bottom view of this ship identified as WCWM/EHFS. This figure illustrates as an example of a release-and-pull wires mechanism as one of many techniques that can be employed to control the open and close of all seven controllable surfaces 8r, 9r, 9r', 8m, 8n, 11f, 11f' on this ship. Since all these surfaces are controlled by their individual but similar mechanisms, therefore only the mechanism controlling 11f and 11f' are illustrated in FIG. 12. And only description of 11f controls is given below:

The twin wire release-pull control mechanism consists of wires 11c and 11c'. One end of each wire 11c and 11c' is attached to the fin 11f at 11t. Next wire 11c or 11c' passes around rollers 11q or 11q' before wrap around a cylindrical drum 11d or 11d'. The electric motor drives this cylindrical drum is not shown to avoid cluttering up this figure. A semi circular duct 11e allows sea water 11w flow through whenever 11f is open, the narrowest point along 11e is also its mid point where a turbine 11b is located. After the sea water 11w passes through turbine 11b the sea water 11w flow out the other end of 11e and exit the ship. Dependent on the sea water current direction relative to the ship's movement and side fin 11f setting, sea water 11w can flow through 11e in either directions and gear box (not shown) will automatically adjust turbine 11b rotation direction changes before the generator 11g. Screens 11s and 11s' are located at both ends of tube 11e to prevent fishes from tangled in the turbine 11b. An electricity generator 11g is located above the turbine 11b to convert sea water current kinetic energy into electricity. Control of 11f' is identical to control of 11f discussed above. Other surfaces are independently controlled by similar mechanisms or by any different techniques.

Figure 13:
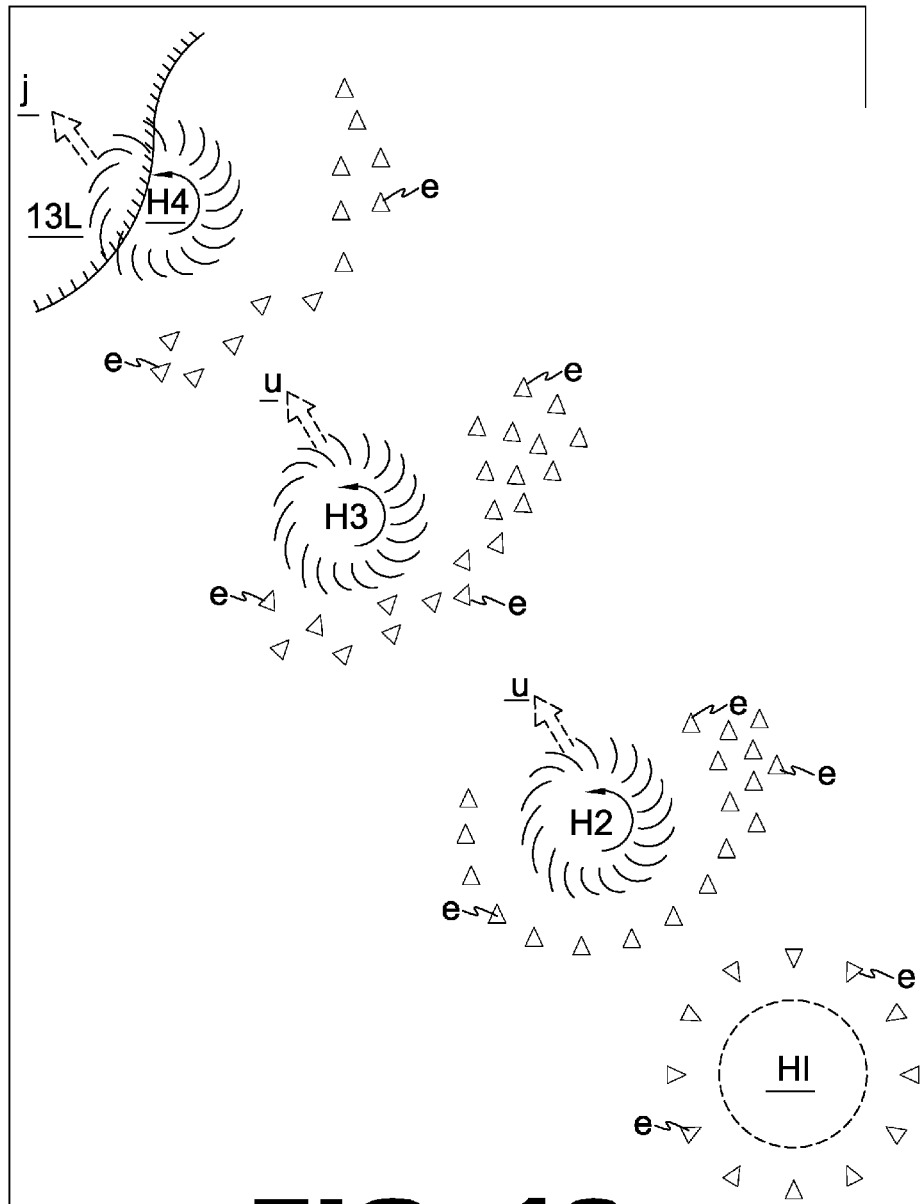
FIG. 13 is an Illustrative view of four stages of a hurricane from it's initial formation at H1 to it's final stage when it reaches land mass 13L AT H4.

FIG. 13 is an Illustrative view of four stages of a hurricane from its initial formation at H1 to it's final stage when it reaches land mass 13L at H4.

Multiple number of WCWM/EHFS e are represented by small triangles which first surround H1. However, as the hurricane grows bigger and has a predicable direction u, the WCWM/EHFS e moved to the right of the hurricane's path u, as shown in H2 and H3. This allows the CCW rotating hurricane to push the WCWM/EHFS along the hurricane's right side.

Note: In southern hemisphere the hurricanes are rotating in the CW direction, therefore most of the WCWM/EHFS will be pushed along the left side of its hurricane route.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A wind cone windmill turbine system wherein a large wind cone is affixed on top of a ship to power a small wind turbine connected to an electrical generator, said wind cone also serves as a sail to propel the ship, said wind cone's cross sectional areas are gradually reducing toward the air exit at the wind cone tip, some portions of the wind cones cross sectional areas are not symmetrical with said wind cone's center line, some portions of said wind cone's center line are designed to gradually bend downwards, there is at least one air exit opening at or near said wind cone tip, there is a wind turbine installed at each wind cone air exit opening to absorb and transform the wind's kinetic energy into rotational energy to power said electric generator wherein at least one submerged fin is symmetrically installed on either side of the ship with a large wind cone installed on a top portion of said ship.

2. The wind cone windmill turbine system according to claim 1, wherein each said fin rotates CW or CCW 180 degrees on their vertical hinges.

3. The wind cone windmill turbine system according to claim 2, wherein said fins are designed to serve as brakes to slow down said ship's motion as pushed by wind on said wind cone sail.

4. The wind cone windmill turbine system according to claim 3, wherein said fins are designed to control said ship's azimuth direction along its trajectory routes.

5. The wind cone windmill turbine system according to claim 4, wherein said fins are designed to control said ship's route trajectory.

6. The wind cone windmill turbine system according to claim 5, where said fins are designed to control said ship's speed along its trajectory route.

7. A small, low cost wind cone windmill turbine system comprising:
  a) a generally horizontal wind cone having a wide air inlet end and a narrow exhaust end;
  b) a cover affixed to said narrow exhaust end such that wind exiting said narrow exhaust end of said wind cone is directed into said cover, said cover including a generally vertical cover exhaust region;
  c) a turbine having a generally horizontal first shaft rotatably affixed to said cover along an axis generally perpendicular to said wind cone, a turbine hub affixed to said first shaft, and a plurality of turbine blades affixed to said turbine hub, said turbine positioned within said cover such that wind exiting said narrow exhaust end of said wind cone is directed toward and turns said plurality of turbine blades, said turbine hub and said shaft, then exits said cover through said cover exhaust region;
  d) a generally vertical tube affixed to said air inlet end of said wind cone;
  e) a tubular post having an upper end and a lower end, said lower end affixed to a ground surface and said upper end rotatably maintained within said vertical tube;
  f) a vertical second shaft having an upper end and a lower end, said second shaft rotatably maintained within said tubular post with said upper end of said second shaft mechanically connected with said first shaft;
  g) a electrical generator affixed to a ground surface, said generator mechanically connected with said lower end of said vertical second shaft.

8. A wind cone windmill turbine system according to claim 7, wherein said wind cone windmill turbine system is affixed to a watercraft, said watercraft is designed to be near a predicted hurricane route.

9. A wind cone windmill turbine system according to claim 7, further comprising a protective screen placed in front of said air inlet end of said wind cone.

10. A wind cone windmill turbine system according to claim 9, wherein said cover is shaped as a rudder behind said wind cone such that said tube is rotatable about said post in response to changing wind directions.

11. A wind cone windmill turbine system according to claim 10, wherein said cover exhaust directs exhaust downward.

12. A wind cone windmill turbine system according to claim 11, further comprising a gear box connecting said lower end of said vertical second shaft to said generator.

13. A wind cone windmill turbine system according to claim 12, wherein said tube is welded to said air inlet end of said wind cone.

14. A wind cone windmill turbine system according to claim 12, wherein said turbine is mechanically connected with said generator by an s linkage.

15. A wind cone windmill turbine system according to claim 12, wherein said air inlet end of said wind cone comprises a circular ring perimeter.

16. A wind cone windmill turbine system according to claim 15, wherein said wind cone has a generally straight horn shape.

17. A wind cone windmill turbine system according to claim 12, wherein said wind cone has a generally ram-horn shape.

18. A wind cone windmill turbine system according to claim 17, wherein said ram-horn shape includes an about 180 degree curve such that said wide air inlet end and said narrow exhaust end of said wind cone face in generally the same generally horizontal direction.

19. A wind cone windmill turbine system according to claim 18, wherein said ram-horn shaped wind cone comprises a plurality of pieces of flat material affixed together into a ram-horn contour.

20. A wind cone windmill turbine system according to claim 19, wherein said wide air inlet end of said wind cone has a perimeter defined by a generally rectangular configurable frame comprising four frame support posts with said material forming said ram-horn contour affixed to said four support posts.

21. A wind cone windmill turbine system according to claim 20, wherein said material forming said ram-horn contour is pliable fabric.

22. A wind cone windmill turbine system according to claim 21, wherein said pliable fabric is selected from the group canvas and nylon.

23. A wind cone windmill turbine system according to claim 22, further comprising a plurality of pressurized compartments which, when pressurized, support said ram-horn contour.

24. A wind cone windmill turbine system according to claim 23, further comprising an air compressor for pressurizing said plurality of pressurized compartments.

25. A wind cone windmill turbine system according to claim 24, wherein said configurable frame comprises:
  a) a pair of generally vertical support posts having upper and lower ends;
  b) a horizontal top support post having oppositely disposed distal, said horizontal top support post moveably affixed to said pair of vertical support posts at said distal ends;
  c) a horizontal bottom support post affixed to said vertical support posts; and
  d) means for moving said top support post between an open position wherein said top support is spaced apart from said bottom support post such that said wind cone forms said ram-horn contour and a collapsed position wherein said top support is adjacent said bottom support post and said wind cone is collapsed.

26. A wind cone windmill turbine system according to claim 25, wherein said means for moving said top support post between an open position and a closed position comprises:
  a) a conduit extending the length of each of said pair of vertical support posts;
  b) a motor driven winch affixed to said lower end of at least one of said two vertical support posts; and
  c) a pair of steel cables having first and second ends, each of said pair of steel cables connected at said first end to said winch and at said second end to one of said distal ends of said top horizontal support bar, each steel cable passing through one of said vertical support posts.

27. A wind cone windmill turbine system according to claim 18, wherein said ram-horn shape such that said wind air inlet end and said narrow exhaust end of said wind cone face in any direction or any angle from the general horizontal direction.

28. A wind cone windmill turbine system according to claim 12, wherein said wind cone windmill turbine system is on a pivotable platform affixed to a terrestrial ground surface.

29. A wind cone windmill turbine system according to claim 28, wherein said terrestrial ground surface is a desert.

30. A wind cone windmill turbine system according to claim 12, wherein said wind cone windmill turbine system is affixed to a watercraft.

31. A wind cone windmill turbine system according to claim 30, wherein said watercraft is selected from the group ocean going cargo sailing ships and floating platforms anchored offshore.

32. A wind cone windmill turbine system according to claim 13, wherein said turbine first shaft is mechanically connected with said upper end of said vertical second shaft by connecting means contained within said cover, said connecting means comprising:
 a) a first sprocket wheel attached to said first shaft;
 b) a first chain mechanically connected with said first sprocket wheel;
 c) a second sprocket wheel mechanically connected with said first chain;
 d) a third shaft attached to said second sprocket wheel;
 e) a third sprocket wheel mechanically connected with said third shaft;
 f) a second chain mechanically connected with said third sprocket wheel;
 g) a fourth sprocket wheel mechanically connected with said second chain;
 h) a fourth shaft z attached to said fourth sprocket wheel;
 i) a first bevel gear affixed to said fourth shaft; and
 j) a second bevel gear mechanically connected with said first bevel gear, said second bevel gear attached to said upper end of said second shaft.

\* \* \* \* \*